United States Patent
Whiteside et al.

(10) Patent No.: US 8,864,415 B1
(45) Date of Patent: Oct. 21, 2014

(54) BUOYANCY SHIFTING APPARATUS FOR UNDERWATER PLOW

(75) Inventors: Steven K. Whiteside, San Diego, CA (US); Robert M. Lee, Descano, CA (US); Ronald A. Skala, Murrieta, CA (US); Paul C. Wade, Chula Vista, CA (US); Bret R. Thomson, San Diego, CA (US); Daniel T. Bridge, La Jolla, CA (US); Tyler J. Browe, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 196 days.

(21) Appl. No.: 13/543,985

(22) Filed: Jul. 9, 2012

(51) Int. Cl.
*E02F 5/10* (2006.01)

(52) U.S. Cl.
CPC ...................... *E02F 5/104* (2013.01)
USPC ......................................... 405/164

(58) Field of Classification Search
USPC ............ 405/76, 158–162, 164, 165, 180–183
See application file for complete search history.

(56) References Cited

U.S. PATENT DOCUMENTS

| | | | |
|---|---|---|---|
| 3,347,054 A | 10/1967 | Sherrod | |
| 3,898,852 A | 8/1975 | Ezoe | |
| 4,022,028 A * | 5/1977 | Martin | 405/159 |
| 4,049,239 A * | 9/1977 | Howell | 166/355 |
| 4,069,679 A | 1/1978 | Manley | |
| 4,892,443 A | 1/1990 | Kunze | |
| 5,542,446 A * | 8/1996 | Rose | 137/81.2 |
| 5,774,421 A | 6/1998 | Vincent | |
| 6,022,173 A * | 2/2000 | Saxon | 405/163 |
| 6,273,642 B1 | 8/2001 | Anderson | |
| 6,371,041 B1 | 4/2002 | Ness | |
| 6,663,453 B2 | 12/2003 | Quigley | |
| 6,942,427 B1 * | 9/2005 | Srinivasan | 405/210 |
| 7,934,561 B2 * | 5/2011 | Ormond | 166/355 |
| 2001/0035000 A1 | 11/2001 | Ehringer et al. | |
| 2010/0008730 A1 * | 1/2010 | Valdy | 405/169 |

FOREIGN PATENT DOCUMENTS

WO    WO 0192649 A1 * 12/2001

OTHER PUBLICATIONS

Unpublished Patent Application entitled "Buoyancy Stabilized Underwater Plow", U.S. Appl. No. 12/880,200, filed Sep. 13, 2010, Brian Shook et al.

* cited by examiner

*Primary Examiner* — Frederick L Lagman
*Assistant Examiner* — Kyle Armstrong
(74) *Attorney, Agent, or Firm* — SPAWAR Systems Center Pacific; Kyle Eppele; Stephen E. Baldwin

(57) ABSTRACT

The present invention provides a means by which an underwater plow can avoid large obstacles that otherwise would prevent the plow from executing its desired path. The underwater plow is released into the water, drops to the sea floor, orients itself, and begins to deploy the sensor array along a pre-programmed path. If the plow encounters a sea floor obstacle, the plow 10 automatically maneuvers to overcome the obstacle and continues deployment of the sensor array. The buoyancy shifting apparatus 110 allows the plow to automatically maneuver. The present invention shifts the center of buoyancy of the underwater plow, thereby allowing the plow to float over obstructions.

7 Claims, 14 Drawing Sheets

BUOYANCY SHIFTING APPARATUS FOR UNDERWATER PLOW

FEDERALLY-SPONSORED RESEARCH AND DEVELOPMENT

This invention (Navy Case No. 101,231) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

CROSS-REFERENCE TO RELATED PATENT APPLICATIONS

This patent application is related to application Ser. No. 12/880,200, filed Sep. 13, 2010, entitled "Buoyancy Stabilized Underwater Plow", assigned to the same assignee as the present application, the details of which are hereby incorporated by reference.

FIELD OF THE INVENTION

The present invention pertains generally to plows. More particularly, the present invention pertains to an autonomous underwater plow, which has a plow assembly that facilitates underwater deployment of sensor arrays on the ocean floor, utilizing a buoyancy shifting apparatus for avoiding underwater obstacles.

BACKGROUND OF THE INVENTION

Sometimes it is necessary to deploy a sensor cable array on the ocean floor, for any one of a number of reasons. In the past, sensor arrays have been primarily deployed by laying the array on the surface of the sea floor. This has usually been accomplished by paying the sensor cable array off the stern of a surface ship.

Surface deployments (deploying the cable on the ocean floor surface) are simpler to execute than buried deployments, but these deployments leave the sensors and connection cables extremely susceptible to damage from marine life. The cable array can also be vulnerable to fishing operations such as trawling, and boating operations where the vessel equipment is passed across the ocean floor. It may be advantageous to bury the array to minimize these risks. When underwater cables are buried, the operation typically requires the use of a large plow pulled by a surface craft. This type of operation is effective, but not covert. In some cases it may be desirable to covertly and autonomously bury a sensor array.

Underwater plows exist and are mostly used for oil, gas, and telecommunications businesses. However, such underwater plows do not have the ability to overcome obstacles on the ocean floor which may be encountered when the plow, or other object, is being deployed.

SUMMARY OF THE INVENTION

In one preferred embodiment, the present invention provides an underwater plow for burying a sensor array in the ocean floor where the sensor array includes a cable and a plurality of sensors attached to the cable. The plow comprises a plow end and a float end having a first orientation relative to ocean floor and a buoyancy shifting apparatus associated with the plow end and float end where the buoyancy shifting apparatus connected to a tow line from a surface ship on the ocean surface and where the buoyancy shifting apparatus has a first neutral state with the center of buoyancy above the center of gravity. The buoyancy shifting apparatus includes a first forward tank associated with the float end and containing a predetermined volume of a gaseous ballast where the first tank includes a first spring-actuated mechanism attached to the tow line and a second aft tank associated with the plow end and connected to the first tank via a conduit. The second tank includes a second spring-actuated mechanism which is actuated when the gaseous ballast is transferred from the first tank to the second tank. The first spring mechanism is actuated when the plow end encounters an obstacle while being towed resulting in increased tension in the tow line and spring compression of the first spring-actuated mechanism such that the gaseous ballast is transferred from the first tank to the second tank, resulting in a shift of the center of buoyancy from the above the center of gravity to below the center of gravity, resulting in a lifting of the plow end and avoidance of the obstacle.

BRIEF DESCRIPTION OF THE DRAWINGS

The features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
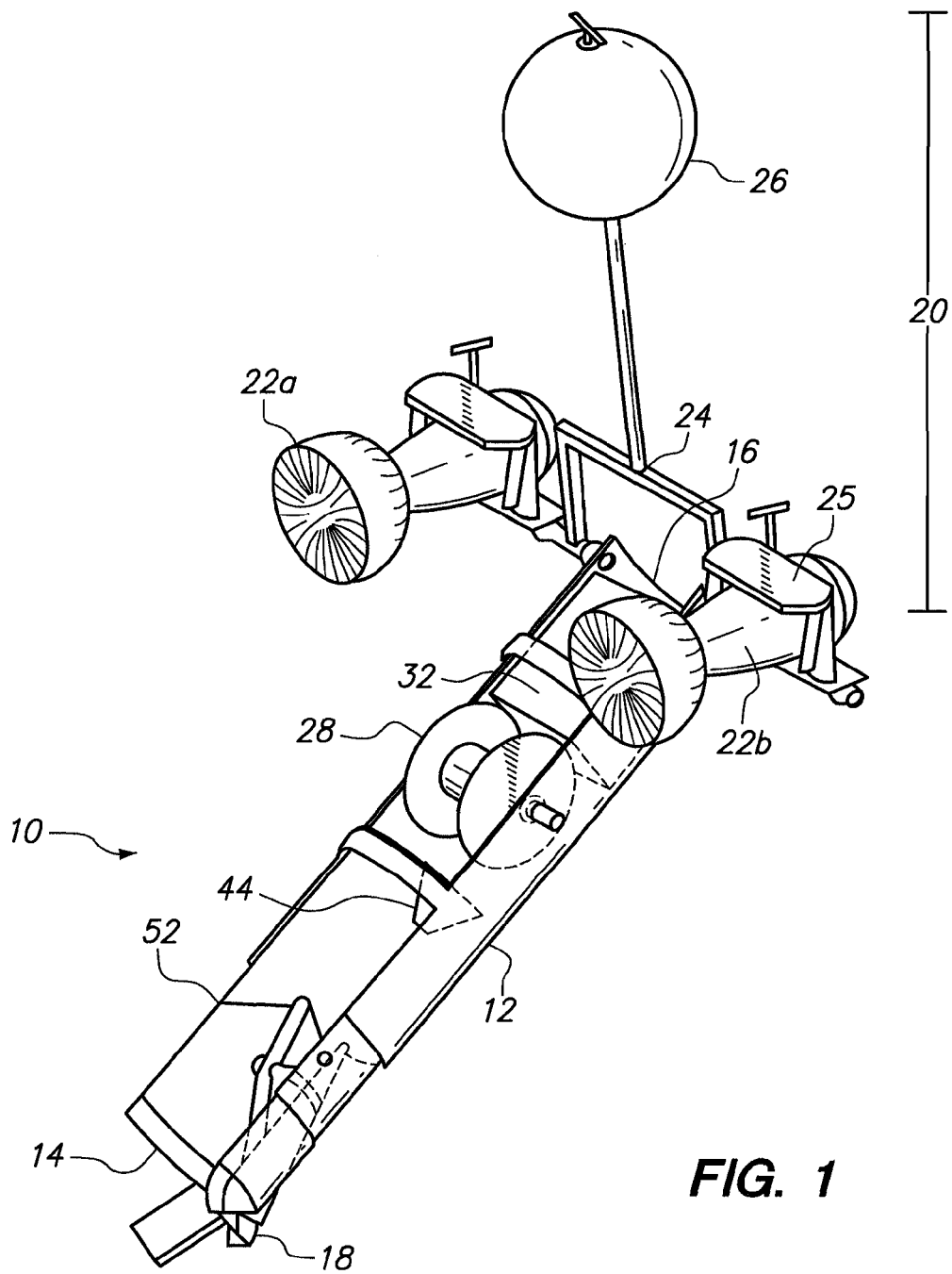
FIG. 1 is an elevational view of an underwater plow according to several embodiments of the present invention.

Referring now to the Figures, an overview of the above cross-referenced patent application will first be described in conjunction with FIGS. 1-13, followed by a description of the buoyancy shifting apparatus shown in FIGS. 16-17.

An autonomous underwater plow according to several embodiments of the present invention can be shown and generally designated by reference character 10. As shown, plow 10 can include a frame 12 having a plow end 14 and a float end 16. A plow assembly 18 can be fixed to the plow end 14, and a propulsion assembly 20 can be pivotably attached to the float end 16 of frame 12, as shown in FIGS. 1-4. Frame 12 can be formed with a semi-cylindrical configuration (although other geometric configurations could be used), which defines a storage space, and a spool 28 can be fixed to frame 12 (See FIG. 1) in the storage space for carrying a sensor-and-cable payload 30. A computer control means (CCM) 32 can also be fixed to frame 12. CCM 32 can be in communication with spool 28, with float 26 and with thrusters 22a, 22b to steer plow 10 and maintain buoyancy of plow 10 as payload 30 is deployed, in manner more fully described below.

Propulsion assembly 20 can further include a pair of thrusters 22a, 22b, that are mounted to a thruster support bar 24 with brackets 25. CCM 32 can also be in communication with thrusters 22 to thereby operate the thrusters to steer plow 10 along a predetermined course. A float 26 can further be attached to thruster support bar 24 to establish a propulsion assembly structure wherein float 26 is rigidly coupled relative to thrusters 22a, 22b. As mentioned above, the propulsion assembly is pivotably attached to frame 12. With this configuration, the propulsion assembly 20 provides a propulsion force $F_P$ that is perpendicular to the buoyancy force $F_B$ provided by float 26 when plow 10 is fully deployed, as shown in FIG. 4.

Figure 2:
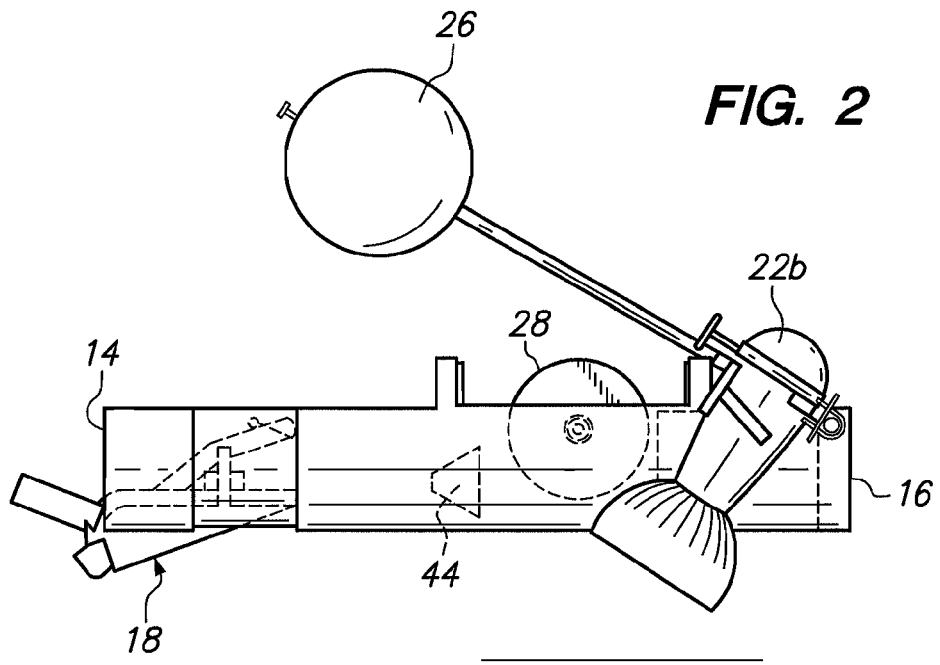
FIG. 2 is a side view of the plow of FIG. 1 while in a stowed state.
Figure 3:
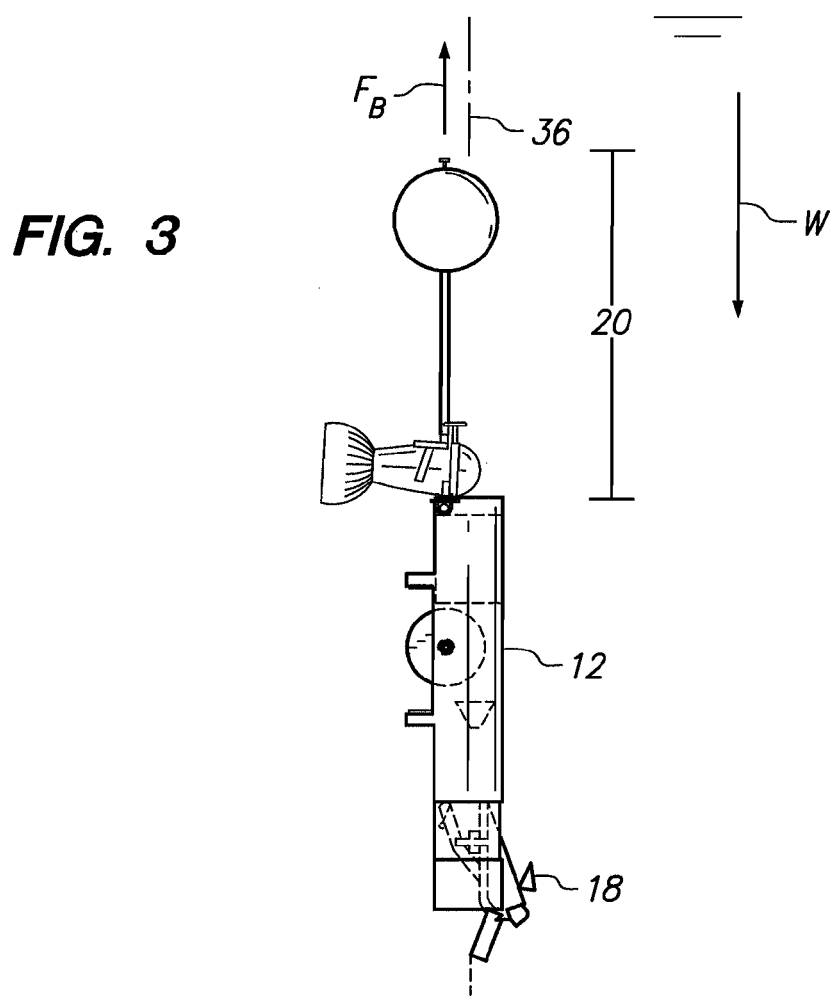
FIG. 3 is a side view of the plow of FIG. 1 after the plow has been initially deployed, while it is sinking toward the ocean floor.

The plow 10 takes up less space when it is in a stowed condition with the propulsion assembly 20 folded over the frame, as shown in FIG. 2. Once at the site where the payload 30 is to be deployed, the plow can be deposited into the water. Despite the presence of float 26, the plow 10 is made of materials that make the plow 10 negatively buoyant in sea water. Stated differently, the plow 10 is formed with materials that result in the overall weight W of the plow 10 being greater than the buoyancy force $F_B$ that is established in float 26. With this configuration, when the plow is released from the deployment vessel, it begins to sink. As the plow sinks toward the sea floor, the float 26 causes the thruster support bar 24 to pivot away from frame 12, from the stowed position to a transit position. While the plow 10 is in transit to the ocean floor, propulsion assembly 20 is aligned with a longitudinal axis 36 defined by frame 12, as shown in FIG. 3.

Figure 4:
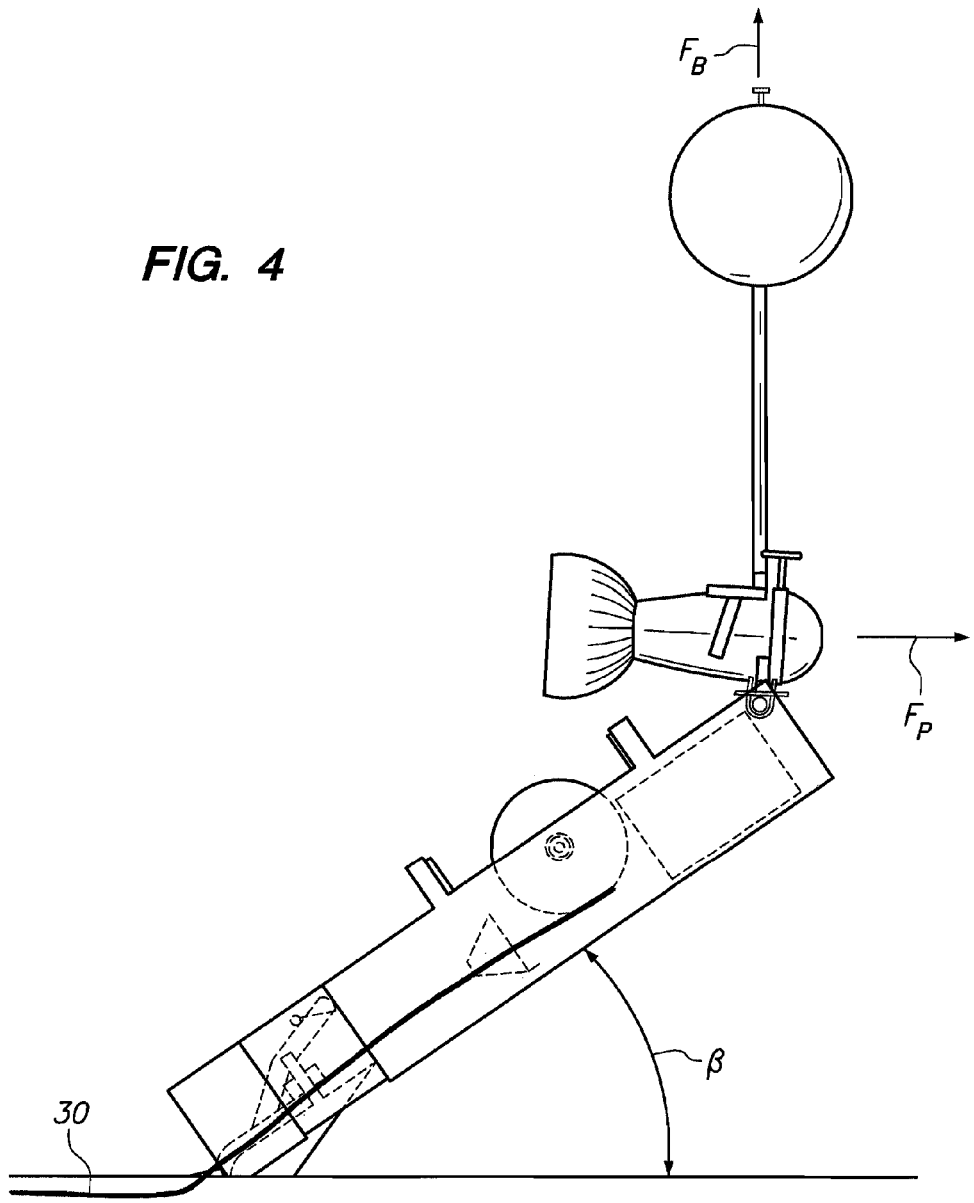
FIG. 4 is a side view of the plow of FIG. 1 with the plow fully deployed on the ocean floor.
Figure 5:
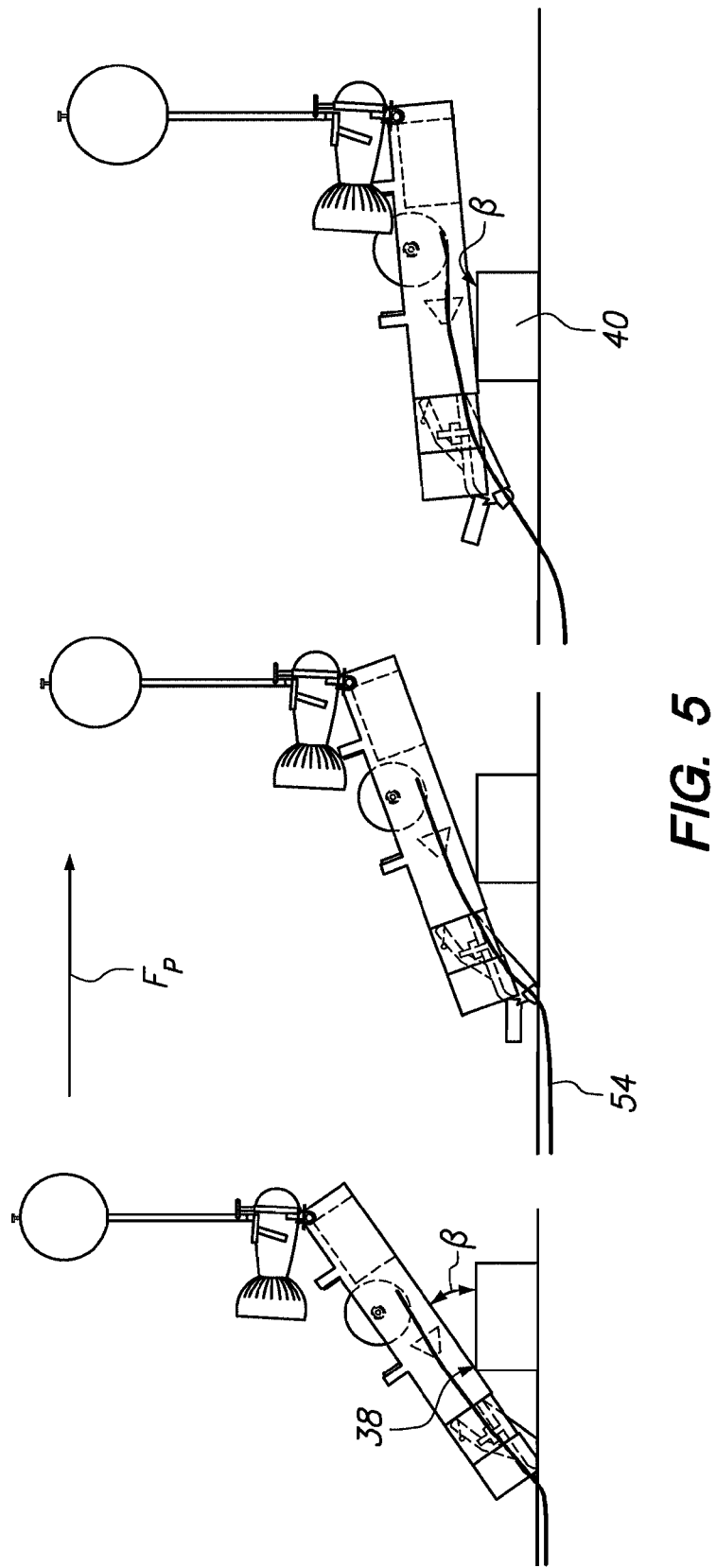
FIG. 5 is the same view of FIG. 4, which illustrates how the plow overcomes an obstacle on the ocean floor.
Figure 6:
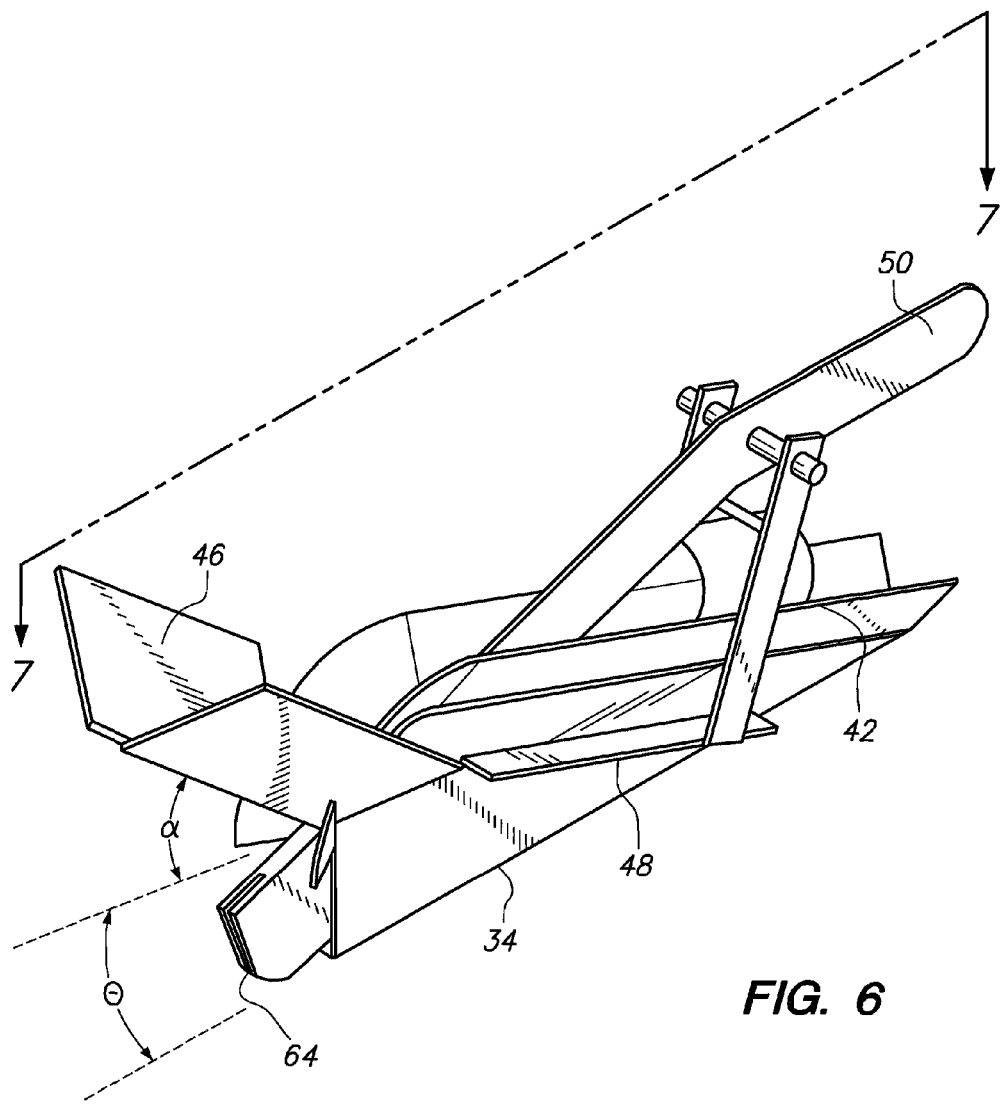
FIG. 6 is a side elevational view of the plow assembly of the plow of FIG. 5.

The plow 10 assumes a posture similar to that shown in FIGS. 4-6 during normal deployment. Once the plow assembly 18 contacts the sea floor, blade 34 of plow assembly 18 digs into the ocean floor. The float 26 provides a buoyancy force $F_B$ that is less than the weight of the plow; however, $F_B$ is sufficient to raise the float end 16 of frame 12 in a manner that establishes a rake angle β between the ocean floor and longitudinal axis 36 of frame 12, as shown in FIG. 4. The arrival of the plow on the sea floor is recognized by a computer control module (CCM) 32 that is fixed to frame 12, either by a contact switch or by other means that are known in the prior art. CCM 32 is in communication with thrusters 22a and 22b, and CCM 32 can send an activation signal to thrusters 22. Once the thrusters 22 are activated, CCM 32 maneuvers the plow 10 according to a preprogrammed heading. To do this, the CCM 32 can include an internal gyrocompass or similar type of structure incorporated therein.

If the plow encounters an obstacle during deployment, and referring primarily now to FIG. 5, the frame 12 pivots about a pivot point 38 on frame 12 where frame 12 contacts obstacle 40. As frame pivots about pivot point 38, float end 16 becomes temporarily lowered and rake angle β is temporarily decreased. This motion decreases the rake angle β of the plow assembly 18, thereby increasing the chance of clearing the obstacle. At the same time, $F_P$ remains constant in the horizontal plane. The decrease in rake angle β allow for more $F_P$ to take effect so that the invention can be more effectively dragged over the obstacle 40 solely by the horizontal propulsive force in thrusters 22, instead of having to be lifted over the obstacle by a remote support ship or the like. The underside of frame 12 can further be fabricated so that it is smooth, without any notches, seams and the like, which could catch on obstacle 40 and cause the plow to become snagged during operation.

While the float end is lowering and the frame 12 is pivoting about pivot point 38 as the plow 10 overcomes obstacle 40, the thrust $F_P$ from the thrusters 22 remains horizontal. This is because of rigid coupling between float 26 and thrusters 22 with support bar 24, and because propulsion assembly 20 pivots on frame 12, as frame 12 pivots on pivot point 38 of obstacle 40. Once the plow 10 has cleared the obstacle, the float raises propulsion 26 and plow blade 34 digs back into the ocean floor to re-establish the rake angle β depicted in FIG. 4.

Figure 7:
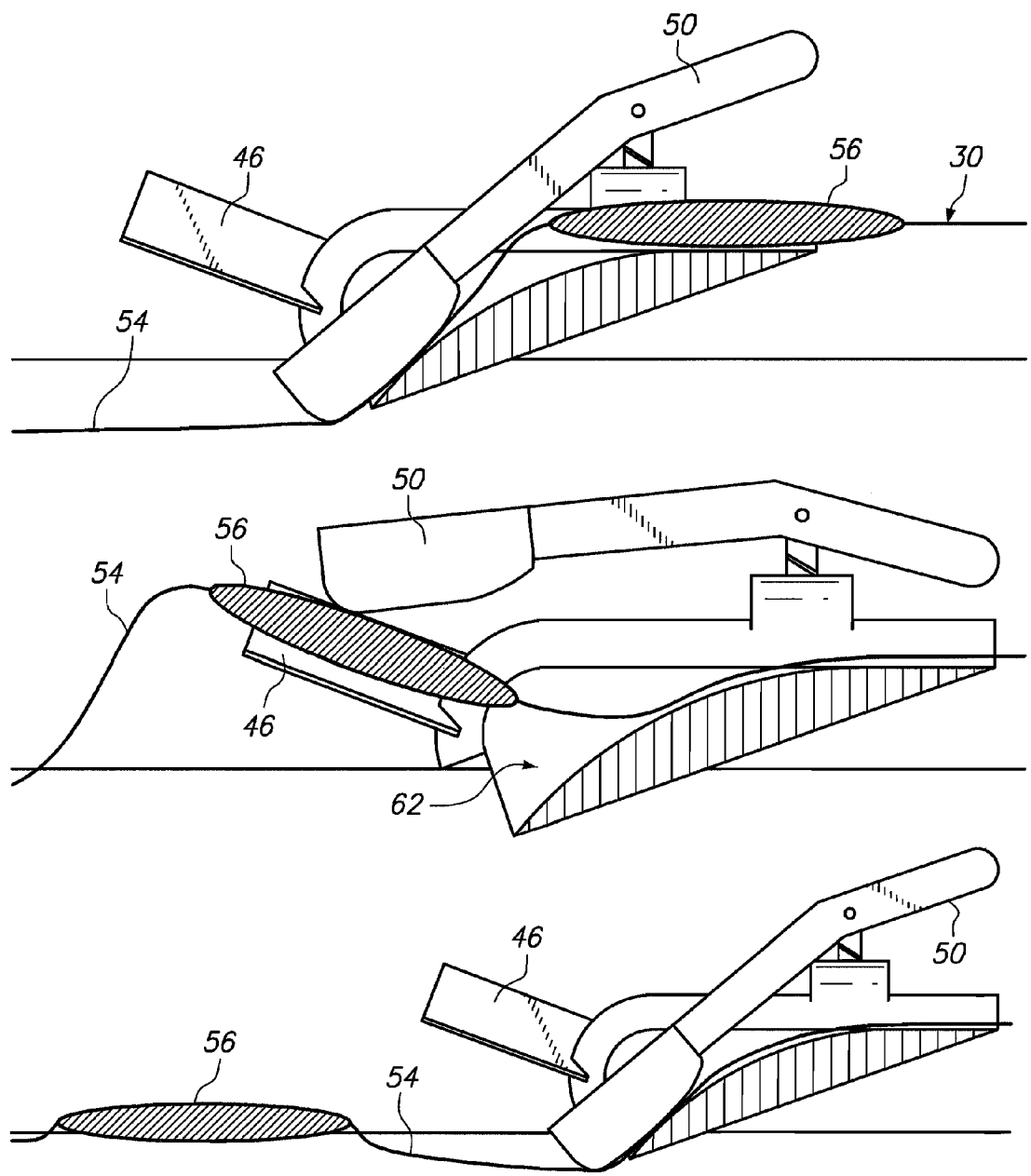
FIG. 7 is a cross-sectional view of the plow assembly of FIG. 6 taken along line 7-7 in FIG. 6, which shows the manner in which the payload is passes through the plow assembly during deployment.

Referring now to FIGS. 6-7, the plow assembly is shown in greater detail. As shown, plow assembly 18 can include horizontal edges 48, which lies in a plan that is coincident with longitudinal axis 36 when plow assembly 18 is fixed to frame 12. Horizontal edges 48 merge into a blade portion 34 that extends below the plane coincident with horizontal edges 48 by an angle θ, and a cable path 42 that is fixed to blade 34. A fairlead 44 can be fixed to the proximal end of plow assembly 18 next to path 42 (fairlead 44 is shown in FIGS. 1-2) to thread cable-and-sensor payload 30 into plow assembly 18. A sensor chute 46 can be attached to the blade 34 so that it extends upwardly from horizontal edges 48 by an angle α with the plane coincident with the aforementioned horizontal edges 48 of blade 34. A depressor arm 50 can be pivotably attached to blade 34 at horizontal edges 48. Blade 34 can define a trough 62, and depressor arm 50 can be biased with a torsion spring (not shown), or other resilient member 52 (See FIG. 1) so that depressor arm 50 rests in the blade trough 62 in contact with blade 34. Depressor arm 50 is formed with a groove 64 at its distal end, as shown in FIG. 6.

During operation of the plow 10, payload 30 is stored on the spool 28, which is fixed to frame 12 in a storage space defined by semi-cylindrical frame 12. Spool 28 has only a small amount of back tension so that payload cable 54 deploys into the trench created by the plow blade 34 as the plow is propelled forward. The payload cable 54 and payload elements 56 are aligned with the plow assembly 18 prior to entering the plow mechanism by the funnel shaped fairlead 44, which is shown in FIG. 1. This ensures the smooth flow of payload cable 54 into the plow assembly 18.

As shown in FIG. 7, the blade 34 digs into the ocean floor 66 and temporarily establishes a trench in the floor as the plow operates. As payload 30 is threaded into plow assembly 18, cable 54 of payload 30 is threaded into the blade trough and exits the blade through groove 64 while blade 34 is in contact with the trough, where causes cable 54 to become buried as the trench dug by blade 34 fills back in. When a sensor element 56 is encountered, however, the element is too wide to pass through groove 64.

Instead of passing through the groove 64 and being buried in the trench established by blade 34, the sensor element 56 is urged upward from the horizontal plane into the sensor chute 46. As the element 56 is urged upward, it forces the plow depressor arm 50 to pivot outwardly and away from the blade trough 62. The depressor arm 50 pivots and allows the sensor element 56 to slide past depressor arm 50 and become directed upward towards sensor chute 46, where the sensor is deposited on the ocean floor after exiting chute 46. When the sensor has passed through the plow assembly, the pivot arm is compelled by spring tension back to its biased position in contact with trough 62, to direct the cable 54 back into the bottom of the plow trough, where it becomes buried when the trench fills back in after the blade 34 passes through the ocean floor. With this configuration, the cable 54 of payload 30 becomes buried during operation of the undersea plow according to several embodiments.

Figure 10:
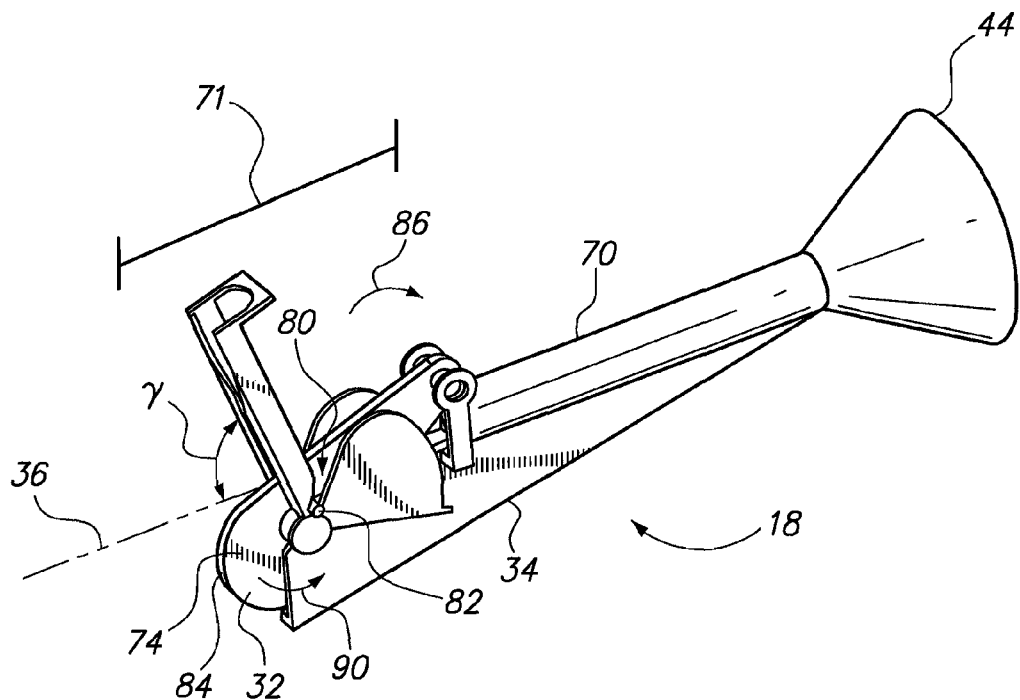
FIG. 10 is a side elevational view of an alternative embodiment of the plow assembly of FIG. 6.
Figure 11:
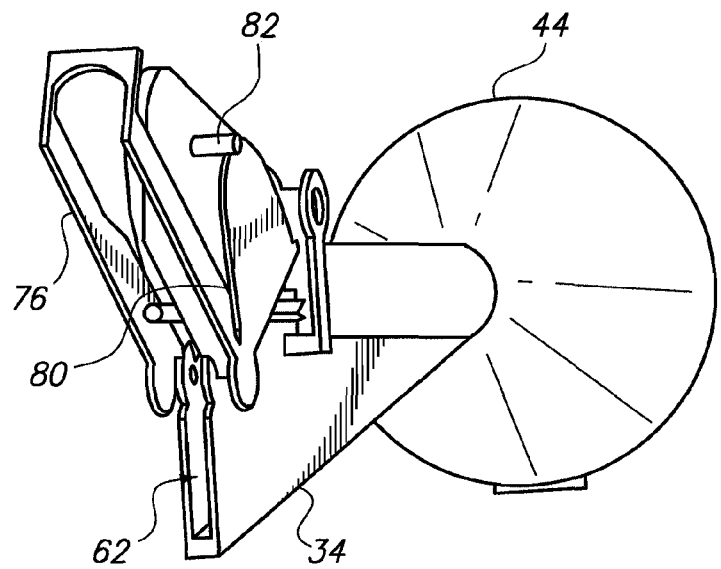
FIG. 11 is a front elevational view of the plow assembly of FIG. 10.
Figure 12:
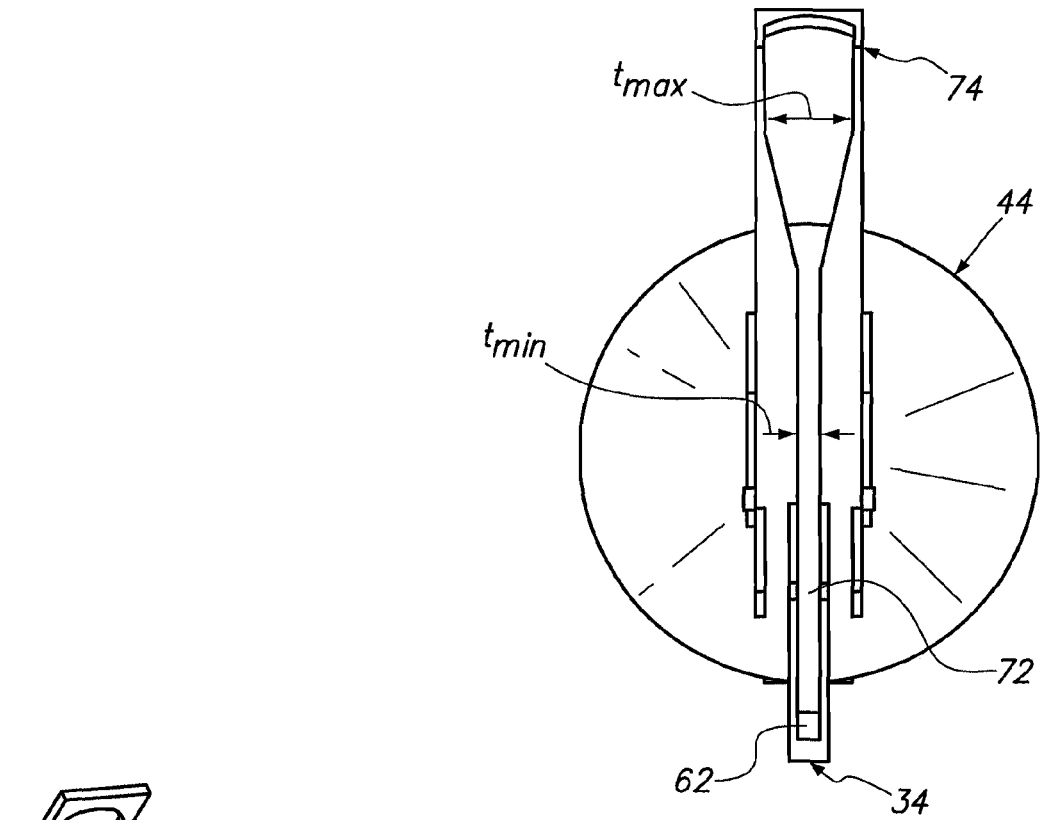
FIG. 12 is a front plan view of the plow assembly of FIG. 10.
Figure 13:
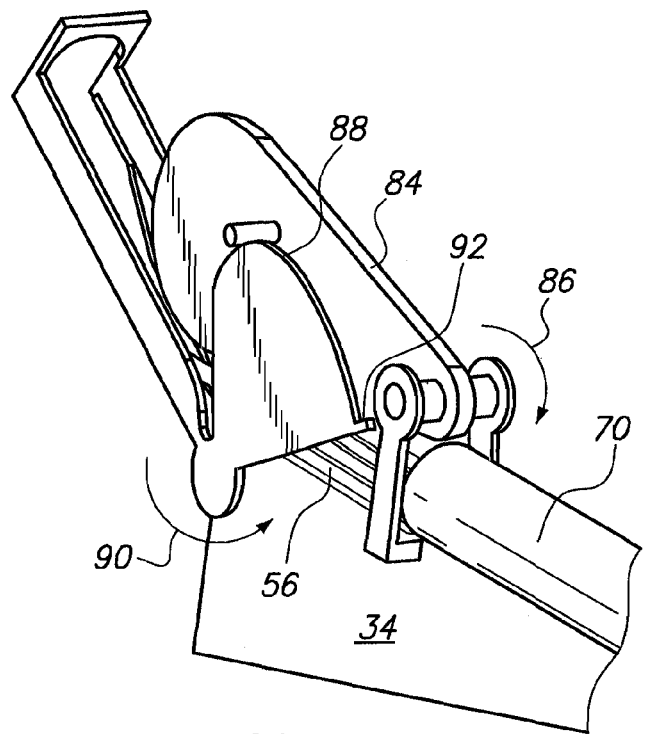
FIG. 13 is a rear elevational view of the plow assembly of FIG. 10.

Referring primarily now to FIGS. 10-13, an alternative embodiment for plow assembly 18 is shown. As shown, plow assembly can include a blade 34 that merges into body 70. A fairlead 44 is attached to the proximal end of body 70. The blade is formed with trough 62, as best seen in FIG. 11. The trough 62 is sized to allow cable 54, but not sensor element 56, to pass through trough 62. A cam assembly 71, which can include a depressor cam 72 and a chute cam 74, can be fixed to blade portion 34. Depressor cam 72 is pivotably attached to blade 34 at a point around the middle of the blade 34, and a chute cam 74 is also pivotably at the distal end of blade 34. The depressor cam 72 has a thickness that corresponds to the width of the trough, so that depressor cam 72 is partially located within trough 62 while in its biased position. A torsional spring or similar type of device can be used to bias depressor cam 72 in contact with blade 34 within the trough 62.

This chute cam 74 has an arm 76 that is formed with a slot 78. As shown in FIG. 11, slot 78 has a minimum thickness $t_{min}$ proximate the attachment point chute cam, with the slot thickness having an increasing taper to a maximum thickness $t_{max}$ at the distal end of arm 76, as perhaps best seen in FIG. 12. The chute cam 74 can biased with a resilient member so that it establishes an angle γ with longitudinal axis 36, as shown in FIG. 10. Chute cam 74 is formed with a notch 80, and pin 82 of depressor cam rests in notch 80 while the cam assembly is in its biased position, as shown in FIG. 10.

For this embodiment, as the blade 34 digs into the ocean floor 66 and temporarily establishes a trench in the floor during operation, payload 30 is threaded into plow assembly 18 through fairlead 44 and body 70. Cable 54 of payload 30 is guided into the blade trough. The edge 84 of depressor cam 72 contacts cable 54, and the biasing action of depressor cam 72 positions cable 54 at the bottom of trough 62 until cable 54 blade 34. As cable 54 exits blade 34, it becomes buried as the trench that had been dug by blade 34 fills back in.

When a sensor element 56 is encountered, however, the element is too wide to enter into blade trough 62. Instead of passing into trough 62, sensor element 56 exits body 70 and rides along the depressor cam edge 84 and the top of blade 34. As sensor element 56 continues to pass through the plow assembly, this cause depressor cam 72 to pivot in direction indicated be arrow 86 in FIGS. 10 and 13. As depressor cam pivots, pin 82 moves out of notch 80 and rides along chute cam edge 86. The movement can allow the chute cam 74 to move in a contra-rotating motion relative to depressor cam 72, in the direction indicated by arrow 90.

Chute cam 74 continues to contra-rotate relative to depressor cam until the pin 80 of depressor cam 72 reaches stop 92 of chute cam 74. Once this occurred, the arm 76 of the chute cam 74 is roughly coincident with longitudinal axis 36. Sensor element continues to move along arm 76 until it reaches a portion of slot 78 with slot thickness that that is sufficient to allow it to drop through arm 76 and become buried in ocean floor 66. Once this occurs, chute cam 74 and depressor cam 76 pop back to their original positions, wherein depressor 72 is within trough 62, wherein depressor cam edge 84 contacts cable 54 and where pin 82 is located substantially within notch 80 of chute cam. When the sensor has passed through the plow assembly, the pivot arm is compelled by spring tension back to its biased position in contact with trough 62, to direct the cable 54 back into the bottom of the plow trough, where it becomes buried when the trench fills back in after the blade 34 passes through the ocean floor. With this configuration, the cable 54 of payload 30 becomes buried during operation of the undersea plow according to several embodiments.

Figure 8:
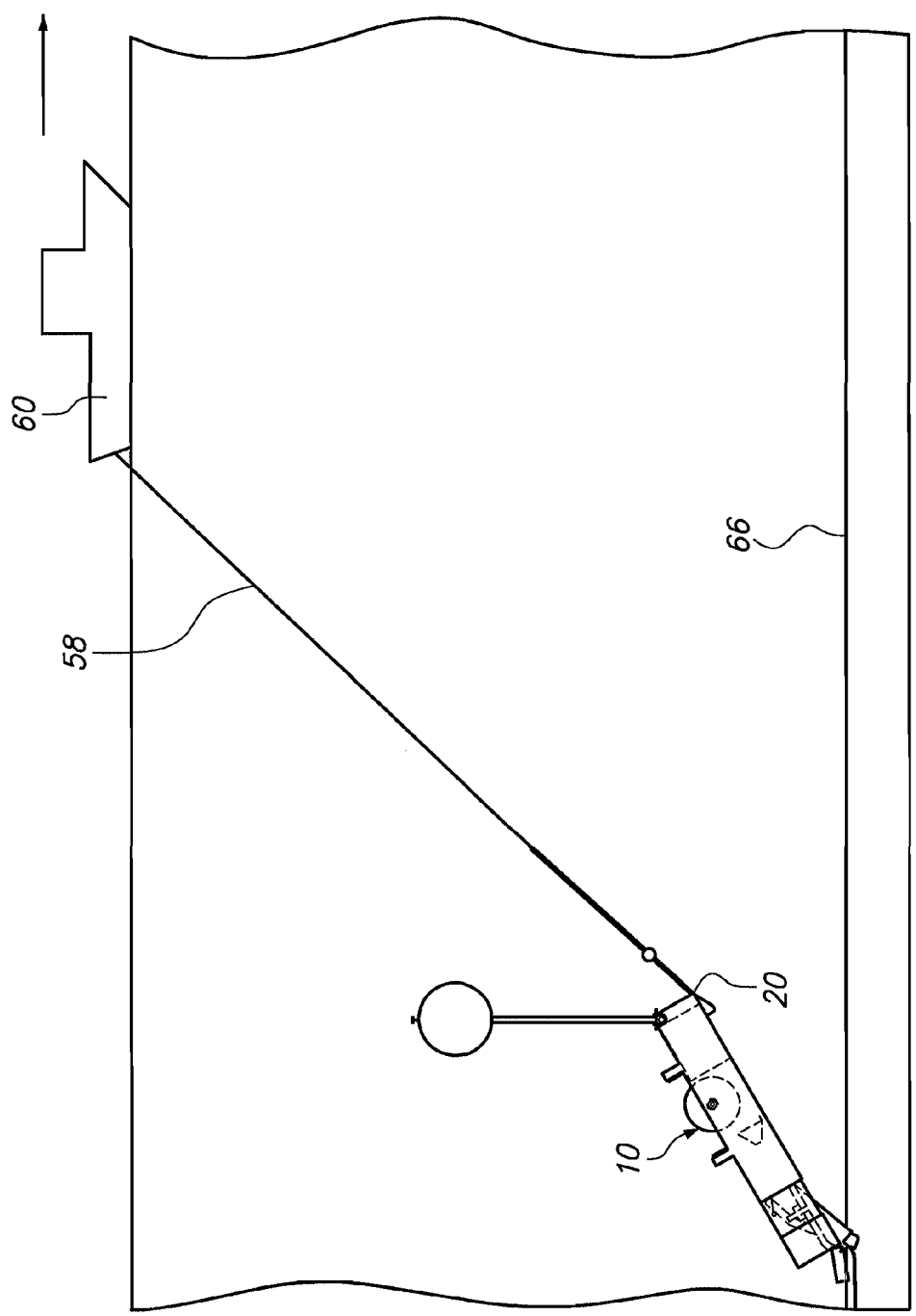
FIG. 8 is a diagram that illustrates how a plow according to several alternative embodiments could be propelled by being towed by a vessel.

Referring now to FIG. 8, an alternative embodiment of the invention is shown. As shown, for some heavy duty applications that include a large payload, or a heavy duty frame 12 that can withstand environmental conditions, it may be desirable to provide additional power to propel the plow 10. For these conditions, the plow 10 can be connected to a surface vessel 60 via towing cable 58 to move the plow in the direction desired by the user. The vessel can either supplement the aforementioned thrusters 22, or it can be used in lieu of the thrusters 22 to provide propulsion force $F_P$ to move the plow 10.

Figure 9:
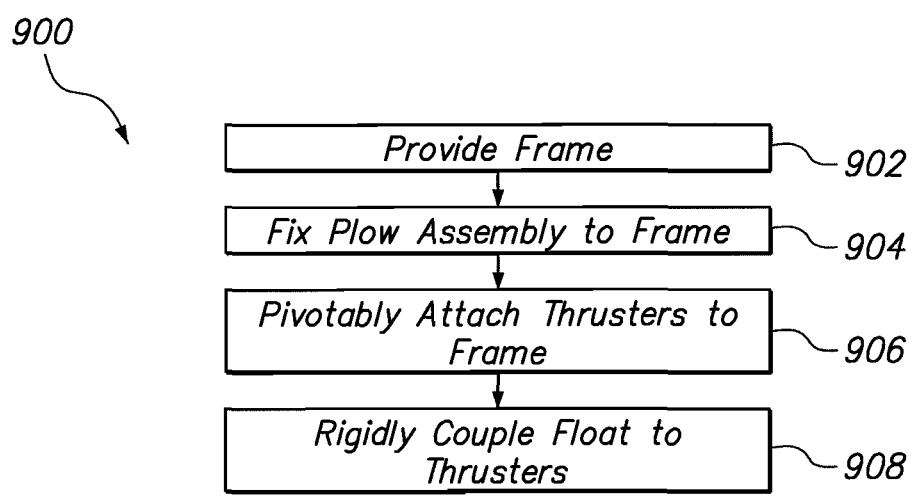
FIG. 9 is a block diagram that is illustrative of steps that can be taken to practice the methods according to several embodiments of the invention.

Referring now to FIG. 9, a block diagram is shown that is illustrative of steps that can be taken to practice the methods of the invention according to several embodiments. As shown in FIG. 9, the steps taken can include the step of providing a plow frame, as illustrated by step 902. The plow frame can have a plow and a float end, and the methods can further include the step of fixing a plow assembly to the plow end, as shown by block 904 in FIG. 9. To propel the underwater plow, a propulsion means (such as thrusters 22, for example) can be pivotably attached to the float end of frame 12, as shown by block 906 in FIG. 9. Additionally, the methods can include the step of rigidly coupling a float to the propulsion means, as shown by step 908 in FIG. 9. The rigid coupling of the float and propulsion means, combined with the pivoted coupling of the propulsion means and frame, allows for operation of the plow 10 as described above. The methods can further include the step of controlling the propulsion assembly to steer the plow 10 on a predetermined course. This can be accomplished by placing an internal gyrocompass in the computer control module 32 that is attached to frame 12 as described above.

The underwater micro-plow 10 shown in FIGS. 1-13 has been developed to deploy and bury a sensor array. The buoyancy shifting apparatus 110 shown in FIGS. 14-17 allows the underwater plow 10 to overcome obstacles as the plow 10 runs its course. The plow 10 deploys the entire array with user defined orientation and is able to execute the desired path through the use of the buoyancy shifting apparatus 110.

Undersea plows exist and are mostly used for oil, gas, and telecommunications businesses. However they differ significantly from the underwater plow in that they do not have the ability to overcome obstacles. The buoyancy shifting apparatus 110 allows the plow 10 to float over large objects and thus is a breakthrough in plow technology.

The present invention provides a means by which an underwater plow can avoid large obstacles that otherwise would prevent the plow from executing its desired path. The underwater plow is released into the water, drops to the sea floor, orients itself, and begins to deploy the sensor array along a pre-programmed path. In one preferred embodiment shown in FIG. 8, the path is dictated by the vessel 60 pulling the plow 10.

Figure 15:
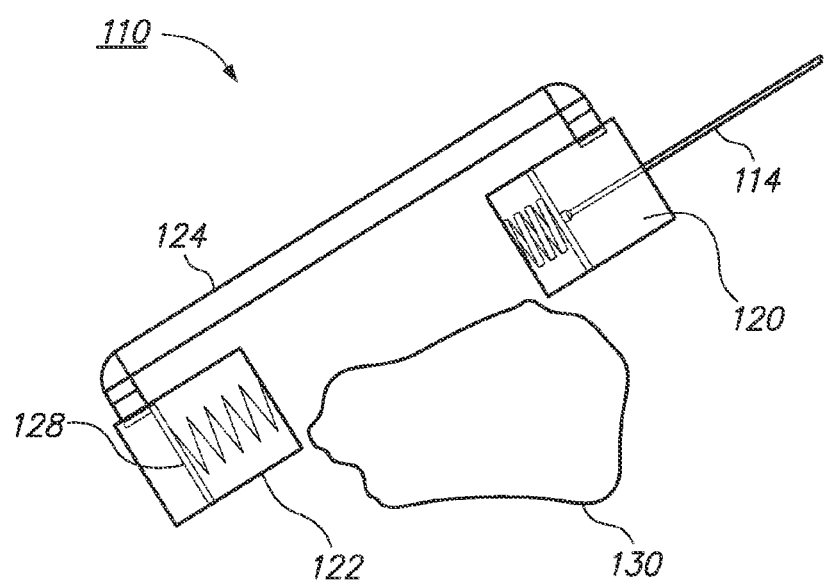
FIG. 15 shows the buoyancy shifting apparatus in a neutral state.
Figure 16:
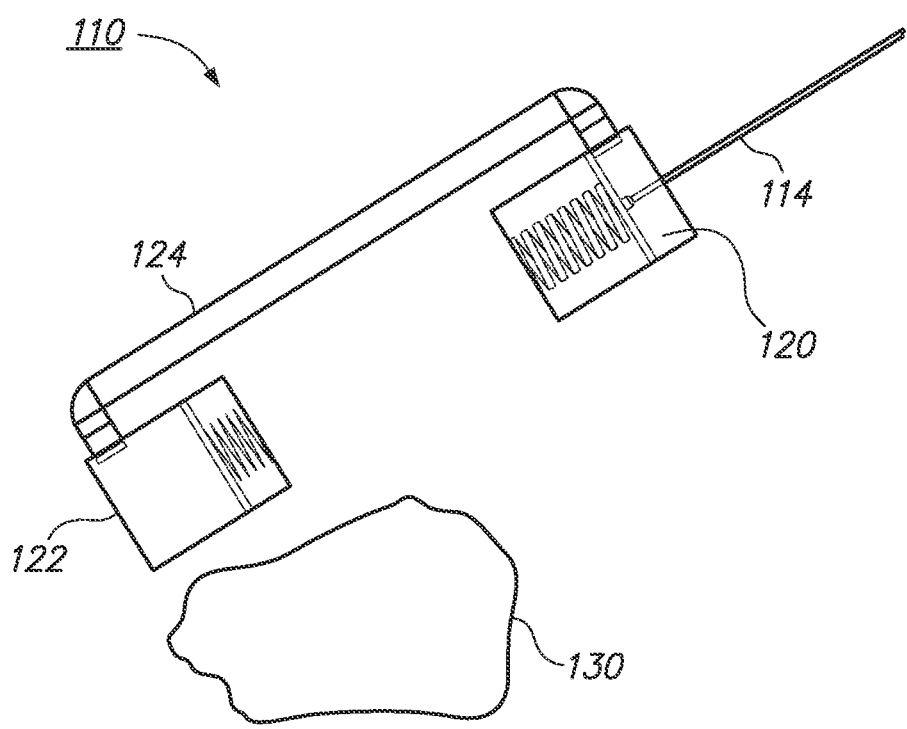
FIG. 16 shows the buoyancy shifting apparatus in a floating state.
Figure 17:
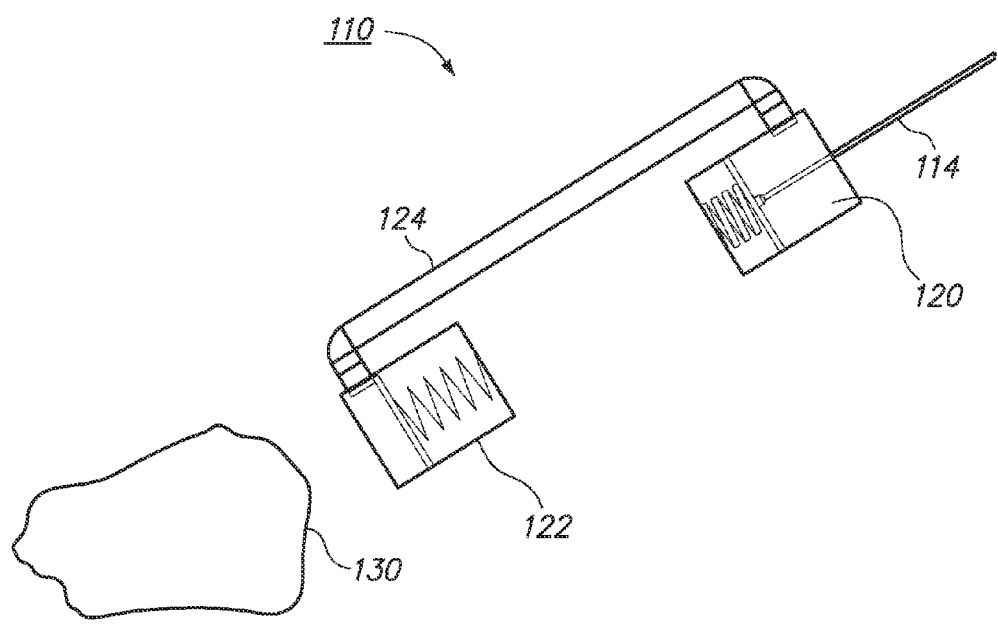
FIG. 17 shows the buoyancy shifting apparatus returned to the neutral state.

If the plow 10 encounters a sea floor obstacle such as obstacle 130 shown in FIGS. 15-17, the plow 10 automatically maneuvers to overcome the obstacle and continues deployment of the sensor array.

The buoyancy shifting apparatus 110 shown in FIG. 15 is what allows the plow 10 to automatically maneuver. The present invention shifts the center of buoyancy of the underwater plow 10, thereby allowing the plow 10 to float over obstructions.

In the past, the center of buoyancy of the underwater plow has remained constant, located near the front of the plow. The location of the center of buoyancy allows the underwater plow 10 to orient itself at an angle $\beta$ with the sea floor and thus carry out its mission of deploying the sensor array. However, when the plow 10 encounters a large obstacle that it cannot maneuver around, the impedance hinders the plow from executing its mission.

There are no known previous methods for obstacle avoidance. Routes would need to be planned and surveyed prior to plow deployment. The present invention eliminates this problem. The plow 10 can now execute its mission even when an obstruction is encountered by floating over the obstruction.

The underwater plow 10 is deposited into the ocean at the site where array installation is to begin. As has been described, the plow 10 has a front, float end and an aft, plow end.

The buoyancy shifting apparatus 110 shown in FIGS. 14-17 is associated with the plow 10 shown in FIGS. 1-13. In one embodiment, the buoyancy shifting apparatus could be mounted alongside the plow 10.

The buoyancy shifting apparatus 110 is connected to a ship on the ocean surface through a cord or tow line 114. As the ship moves, it drags the buoyancy shifting apparatus 110 (and the plow 10), allowing the plow 10 to execute the desired path. When an obstacle is encountered, the plow becomes fixed in place and the tension in the cord 114 connecting to the ship will increase substantially.

Figure 14:
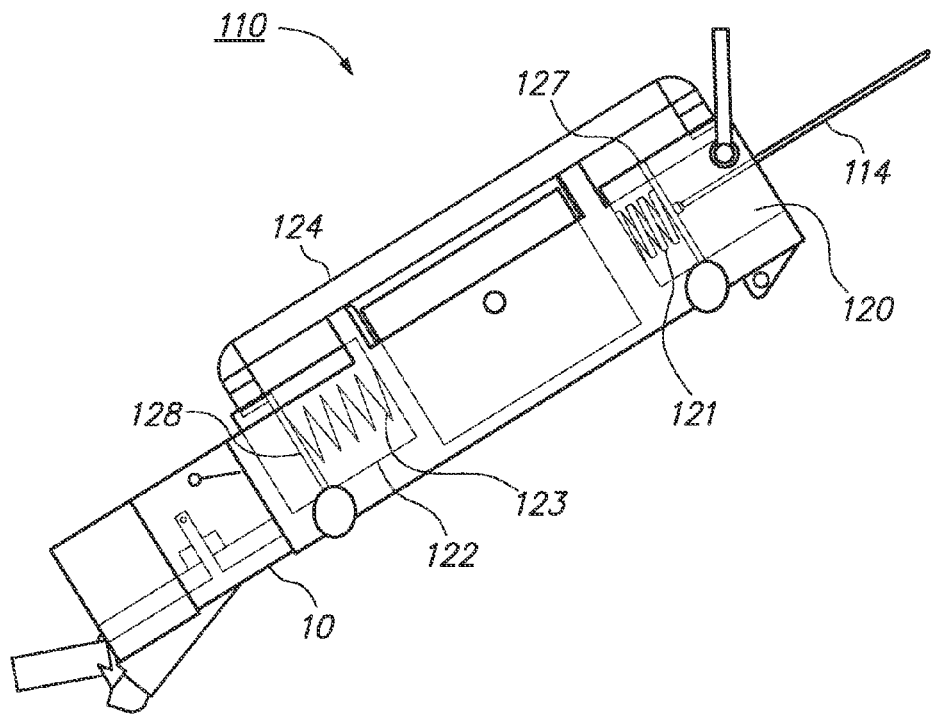
FIG. 14 shows an overview of an underwater micro-plow with buoyancy shifting apparatus.

FIG. 14 shows an overview of the buoyancy shifting apparatus 110 and FIGS. 15-17 illustrate the operation of the buoyancy shifting apparatus 110.

The apparatus 110 includes a first, upper tank 120 associated with the float end of plow 10, and a second, aft tank 122 associated with the aft or plow end of plow 10.

When encountering an obstacle, the increase in tension in the cord 114 will cause the spring 121 in the upper tank 120 to expand. As the spring expands via piston 127, the volume of the upper tank 120 decreases and gaseous ballast is transferred from the upper tank 120 to the lower tank 122 via conduit or pipe 124. In one embodiment, the gaseous ballast can be air.

As air fills up the lower tank 123, spring 123 is compressed, allowing the volume of lower tank 122 volume to increase via piston 128. Once the upper tank 120 has been completely depleted of air, the lower tank 122 will now be at maximum volume. The shift of air volume causes the center of buoyancy to shift from above the plow's center of gravity (i.e., the first or original orientation of the center of gravity) to below the plow's center of gravity (i.e., the second center of gravity, below the first center of gravity). Once the center of buoyancy has shifted, the plow's backside is lifted up allowing the plow to float over the obstacle 130, as shown in FIGS. 15-17.

After the obstacle 130 has been overcome, as shown in FIGS. 15-16, the tension in the cord 114 connecting to the ship will decrease. As the tension decreases the spring 121 of upper tank 120 will compress, increasing the volume of the upper tank 120. The spring 123 of lower tank 122 is now allowed to expand, pushing the air from the lower tank 122 back into the upper tank 120. The center of buoyancy again shifts, but now shifts from below the center of gravity to above the center of gravity. Once complete, the plow is now back in its neutral state as shown in FIG. 17 and can continue its deployment of sensor arrays.

The present invention represents a significant advance in underwater plow technology. The buoyancy shifting apparatus 110 allows the underwater plow 10 to float over obstacles that otherwise would hinder its ability to deploy the sensor array. It accomplishes this through the use of variable volume air tanks and a contained spring system that have been designed into the existing underwater plow. The present invention maintains all of the features of the original underwater plow design while eliminating the disadvantage of obstacle impediment.

The air tanks with variable volume are flexible in design and could be constructed in a variety of different ways. The air tanks could also be located differently to maximize or minimize buoyancy displacement. Also, components are scalable so that larger or small components can be substituted to develop larger or smaller devices.

As described above, in one embodiment, the buoyancy shifting apparatus 110 could be mounted alongside the plow 10. In another embodiment, the first air tank could be mounted at the float end of the plow 10, and the second, aft air tank could be mounted on the plow end of the plow 10, so long as the two tanks are connected via the conduit to allow transfer of the gaseous ballast.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of any ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

From the above description, it is apparent that various techniques may be used for implementing the concepts of the present invention without departing from its scope. The described embodiments are to be considered in all respects as illustrative and not restrictive.

For example, embodiments of the buoyancy shifting apparatus of the present invention could be utilized in applications for towing underwater objects in oil, gas, and telecommunications businesses, where there is a need for automatically avoiding obstacles during operations involving towing of underwater objects.

It should therefore be understood that the present invention is not limited to the particular embodiments described herein, but is capable of many embodiments without departing from the scope of the claims.

What is claimed is:

1. An underwater plow for burying a sensor array in the ocean floor, the sensor array including a cable and a plurality of sensors attached to the cable, the plow comprising:
   a plow end and a float end having a first orientation relative to ocean floor;
   a buoyancy shifting apparatus associated with the plow end and float end, the buoyancy shifting apparatus connected to a tow line from a surface ship on the ocean surface, the buoyancy shifting apparatus having a neutral state center of buoyancy above the center of gravity, the buoyancy shifting apparatus including
      a first, forward tank associated with the float end and containing a predetermined volume of a gaseous ballast, the first tank including a first spring-actuated mechanism attached to the tow line,
      a second aft tank associated with the plow end and connected to the first tank via a conduit, the second tank including a second spring-actuated mechanism which is actuated when the gaseous ballast is transferred from the first tank to the second tank, the first spring mechanism actuated when the plow end encounters an obstacle while being towed resulting in increased tension in the tow line and spring compression of the first spring-actuated mechanism such that the gaseous ballast is transferred from the first tank to the second tank, resulting in a shift of the neutral state center of buoyancy from the above the center of gravity to below the center of gravity of the buoyancy shifting apparatus, resulting in a lifting of the plow end and avoidance of the obstacle.

2. The apparatus of claim 1 wherein after avoidance of the obstacle, a resulting decrease in tension in the tow line results in a decrease of spring compression and a re-shifting of the neutral state center of buoyancy and a return to the first orientation.

3. The apparatus of claim 1 wherein the gaseous ballast is air.

4. An underwater plow for burying a sensor array in the ocean floor, the sensor array including a cable and a plurality of sensors attached to the cable, the plow comprising:
   a plow end and a float end having a first orientation relative to ocean floor;
   a buoyancy shifting apparatus associated with the plow end and float end, the buoyancy shifting apparatus connected to a tow line from a surface ship on the ocean surface, the buoyancy shifting apparatus having a neutral state center of buoyancy above the center of gravity, the buoyancy shifting apparatus automatically shifting the first neutral state of the center of buoyancy when encountering an obstacle on the ocean floor while being towed resulting in a shift of the neutral state center of buoyancy from the above the center of gravity to below the center of gravity of the buoyancy shifting apparatus, resulting in a lifting of the plow end and avoidance of the obstacle.

5. The apparatus of claim 4 wherein after avoidance of the obstacle, a resulting decrease in tension in the tow line results in a decrease of spring compression and a change of the center of buoyancy back to the neutral state center of buoyancy and a return to the first orientation.

6. The buoyancy shifting apparatus of claim 5 further including:
   a first, forward tank associated with the float end and containing a predetermined volume of a gaseous ballast, the first tank including a first spring-actuated mechanism attached to the tow line,
   a second, aft tank associated with the plow end and connected to the first tank via a conduit, the second tank including a second spring-actuated mechanism which is actuated when the gaseous ballast is transferred from the first tank to the second tank, the first spring mechanism actuated when the plow end encounters an obstacle while being towed resulting in increased tension in the tow line and spring compression of the first spring-actuated mechanism such that the gaseous ballast is transferred from the first tank to the second tank, resulting in a shift of the neutral state center of buoyancy from the above the center of gravity to below the center of gravity of the buoyancy shifting apparatus, resulting in a lifting of the plow end and avoidance of the obstacle.

7. An underwater device to towing an object on the ocean floor, the device comprising:
   a buoyancy shifting apparatus associated with the object where the object has a first orientation relative to the ocean floor, the buoyancy shifting apparatus including:
      a first, forward tank associated with the object and containing a predetermined volume of a gaseous ballast, the first tank including a first spring-actuated mechanism attached to the tow line,
      a second, aft tank associated with the object and connected to the first tank via a conduit, the second tank including a second spring-actuated mechanism which is actuated when the gaseous ballast is transferred from the first tank to the second tank, the first spring mechanism actuated when the object encounters an obstacle while being towed resulting in increased tension in the tow line and spring compression of the first spring-actuated mechanism such that the gaseous ballast is transferred from the first tank to the second tank, resulting in a shift of the neutral state center of buoyancy from the above the center of gravity to below the center of gravity of the buoyancy shifting apparatus, resulting in a lifting of the object and avoidance of the obstacle and wherein after avoidance of the obstacle, a resulting decrease in tension in the tow line results in a decrease of spring compression and a re-shifting of the neutral state center of buoyancy back to the first center of buoyancy and a return to the first orientation.

* * * * *